Nov. 6, 1956  R. J. GUBA  2,769,531
WOVEN WIRE CONVEYER BELT
Filed May 5, 1953

INVENTOR.
RAYMOND J. GUBA
BY John D. Myers
ATTORNEY

United States Patent Office 2,769,531
Patented Nov. 6, 1956

2,769,531

WOVEN WIRE CONVEYER BELT

Raymond J. Guba, Rydal, Pa., assignor to Audubon Wire Cloth Corporation of New Jersey Application May 5, 1953, Serial No. 353,213

4 Claims. (Cl. 198—203)

The invention relates to woven wire conveyer belts and involves an improvement wherein the lateral edges of such belts are so constructed as to provide a positive and accurate driving means integral therewith notwithstanding any elongation which results from the use of such belts, particularly under high temperature conditions such as found in annealing furnaces and the like, and notwithstanding the absence of the conventional chain drives often employed with belts of this general type.

It has been the practice heretofore, in operating wire belts, to utilize driving means in the form of a roll or drum over which the belt is passed in such a manner that it is driven by the tractioned effect between the drum and belt. In some cases attempts have been made to overcome the slippage of belts driven in this manner and obtain a positive and accurate drive for the belt by providing the driving drum with flat faces or lags for engagement with the face of the belt to increase the traction between the drum and the belt. In other cases attempts have been made to secure a positive drive by providing the drum with driving pins which extend into the open spaces of the belt and engage with the elements which make up the body or fabric portion of the belt.

As is well understood in such cases, the driving pull upon the belt is transmitted from element to element throughout the length of the belt, and, where helical coils are used, the tendency of the turns of the coils to stretch when the belt is in use necessitates some provision for keeping the belt under proper tension, and makes it difficult to maintain a positive and accurate drive.

In order to meet the above objections, it has been common practice to provide the opposite edges of wire belts with variously constructed chain drives secured to the belt in some appropriate manner, such as by the use of cross rods extending outwardly beyond the edges of the belt and serving as pintles for the links of the chains. As is well known, however, drive chains of this character are expensive and add materially to the cost and maintenance of a wire conveyer belt.

One of the principal objects of the present invention is the provision of a non-stretching woven wire belt with positive driving means so constructed as to form an integral part of the belt itself and employing no parts other than those normally used in the construction of the belt proper.

Another object of the invention is the provision of a wire conveyer belt which has its longitudinal edges so formed as to constitute driving means for the belt without the addition of separate driving elements as has been the practice heretofore.

A still further object of the invention is the provision of a wire conveyer belt with longitudinal edges which are so formed that they cooperate with sprocket wheels or the like and serve as the driving means for the belt without imposing any driving strain or tension on the helical coils employed in the body of the belt.

Other objects and advantages of the invention will be apparent from the following description, taken with the accompanying drawing wherein.

Figure 1:
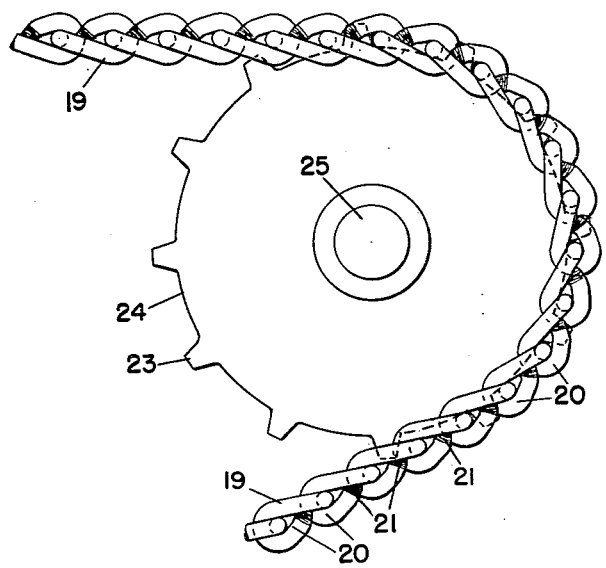
Fig. 1 is a side elevational view of a portion of a conveyer belt structure having the present improvement incorporated therein.
Figure 2:
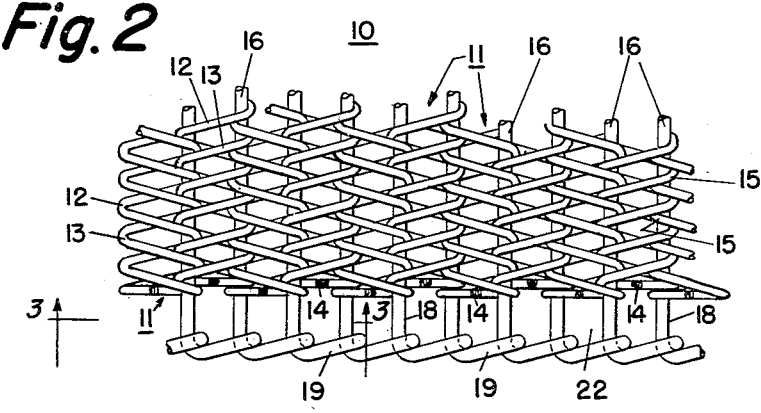
Fig. 2 is a plan view of a portion of a conveyer belt embodying the present improvement.

While the present improvement may be utilized in making belts from other types of woven wire fabric, it is illustrated in the drawing in connection with a fabric 10 in which the successive coil units 11 are of a composite character and comprise two helical coils 12, 13 of the same twist, threaded together in a well-known manner so as to form a unit confined within the marginal limits of a single coil. The length of the coils 12, 13 is such as to provide a belt of the width desired. Preferably the adjacent ends of the two coils in each unit are welded together, as shown at 14, at each end of the coil unit.

In the construction shown in the drawing, successive coil units 11 are made of coils of different twist, and the successive units of rights and lefts are connected by arranging the units side by side so that the turns of the coils of one unit overlap the turns of the coils of adjacent units. The bights 15 of the overlapping turns provide transversely aligned openings to receive cross rods 16 for retaining the coils of adjacent units in overlapping position.

The coil units 11 and cross rods 16 may be secured against relative movement in a direction lengthwise of the rods 16 by welding the end turn of one of the coils of every other unit 11 to a cross rod 16 as shown at 17. It will be understood, of course, that the coil units are welded to every other cross rod only, in order that proper flexibility of the belt may be maintained. With such a construction it will be noted that every other coil unit 11 is thus secured to every other cross rod 16, and the remaining or intermediate cross rods 16 are not secured to either of the coil units 11 through which they extend.

The present improvement may be incorporated in a belt such as that described above by extending the cross rods 16 beyond the ends of the coils as shown at 18, bending the outer ends of each extension to form an angular portion 19 to connect with the extension 18 on an adjacent rod 16, and bending the free end of each angular portion 19 into the form of an eye 20 to receive the extension 18 on the adjacent rod. In forming the eyes 20, the extreme outer ends of the angular portions 19 are welded to the angular portions as shown at 21. This forms a driving structure which is sufficiently flexible for use in a conveyer belt, and is free from elongation in normal use of the belt.

By constructing the belt in the manner just described, the edges are provided with suitable openings 22 to receive the teeth 23 of a sprocket wheel 24 for the purpose of imparting movement to the belt. The extensions 18 can readily be made of such length as may be necessary in order to cooperate with sprocket teeth 23 of the desired width, and they may be provided with anti-friction rollers if desired. A sprocket wheel 24 is preferably secured to each end of the shaft 25 which may be driven in any suitable manner in order to impart movement to the belt.

As shown by the drawing, the teeth 23 of the sprocket wheels 24 are so spaced as to engage with every other opening 22, although they may be arranged otherwise if desired. Preferably the belt is made of an even number of coil units 11, and consequently it has an even number of sprocket teeth openings 22. When the belt is made in this manner, it is preferable to provide an odd number of teeth 23 on the sprocket wheels 24 in order that there may be uniform wear on each of the extensions 18.

Inasmuch as an important feature of the invention is the provision of a drive which does not impose any substantial driving pull upon the turns of the coils even when the belt is subjected to a heavy load, and an object is to accomplish this without incorporating in the belt proper any additional features such as conventional chain drives, the main purposes of the invention are achieved by making the length of the angular portions 19 such that the cross rods 16 are spaced an over-all distance from each other which is less than the distance between the bights 15 at the opposite ends of the turns of the coils in each coil unit 11 when measured longitudinally of the belt or at right angles to the rods 16. In other words, when the belt is in use the total length of the driving means is less than the total length of the fabric portion of the belt if the latter were fully extended.

Figure 3:
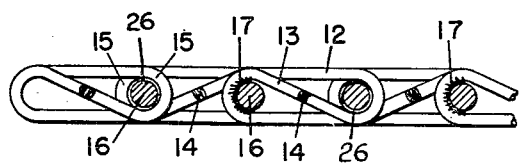
Fig. 3 is an enlarged longitudinal sectional view taken on the line 3—3 of Fig. 2, and showing, in exaggerated form, the relation of the turns of the coils of the belt to the cross rods when the belt is in use.

When so constructed, and as will be apparent from the exaggerated showing in Fig. 3, which represents a cross section in a plane perpendicular to the cross rods (throughout a part of the belt), the length of the openings formed by the bights 15 of the overlapping turns of adjacent coils, measured longitudinally of the belt, is slightly greater than the diameter of the cross rods 16. This spatial relationship between the cross rods and the overlapping or interlacing turns of the helical coils provides appreciable clearance 26 of the turns about the rods (except at welds 17); in Fig. 3, such clearance is shown as uniform all around the rod, ignoring for convenience the obvious gravitational effect of the weight of the belt or of objects carried by it. In this construction the thrust of the teeth 23 upon the extensions 18 is transmitted as a pulling action through the angular portions 19 to successive extensions 18 without imposing the driving load upon the turns of the coils. The turns of the coils are therefore not subjected to the strain which results when the pulling action is transmitted directly from coil to coil with the consequent deformation of the turns and resulting stretch or elongation of the belt. This is true notwithstanding the fact that every other cross rod is preferably welded to certain coil units as described above.

In constructing a belt of the kind described herein, it is preferable to utilize suitable guide or pattern means, such as a jig, in forming the angular portions 19 and the eyes 20. This will insure driving means in which the parts are accurate, of uniform construction, and of the required dimensions to take the pulling load without transmitting it to the turns of the coils or other elements composing the body or fabric portion of the belt.

What I desire to claim is:

1. A conveyor belt constructed of helical coils arranged side by side with the turns of each overlapping and having uniform rods extending transversely of the belt through the aligned openings formed by the overlapping turns, with the least dimension of the openings, measured in a plane perpendicular to the rods, appreciably exceeding the rod diameter the improvement in driving means therefor which comprises integral driving extensions on the ends of each rod, including an integral angular portion on the outer end of each extension, and an eye spaced from the ends of the helical coils overlapping the rod and located at the free end of each angular portion and snugly encircling the extension at the end of an adjacent rod to provide a hinge connection therewith, thereby spacing adjacent rods uniformly from one another lengthwise of the belt and ensuring adequate clearance longitudinally of the belt between the individual rods and the surrounding helical coils of the belt.

2. The belt of claim 1, in which alternate rods are affixed to a single one of the pair of helical coils through whose turns each of them extends, only alternate coils being so affixed.

3. The belt of claim 1, in which each helical coil is composed of a plurality of like windings uniformly spaced from one another at opposite sides of the coil and attached to one another at their opposite ends.

4. A conveyer belt having a body portion of uniform width containing a plurality of flattened helical coils of uniform maximum inner transverse dimension and located with their longitudinal axes extending the width of the body, with turns of adjacent coils interlacing one another, and including parallel cross rods of uniform diameter extending through the interlaced turns and having edge portions formed by termination of the rods beyond both ends of the helical coils, each end of each rod terminating in an eyelike portion, formed in a plane substantially perpendicular to the body portions of the rods, spaced from the ends of the helical coils and adapted to separate the centers of the component rod and the rod encircled thereby from one another by a distance appreciably less than the amount by which the maximum inner transverse dimension of the surrounding coil exceeds the rod diameter, whereby the belt is forwardable by application of driving stress to the rod extensions between the eyelike portions thereof and the ends of the surrounding coils with unchanged maximum inner transverse dimension of the coils.

References Cited in the file of this patent

UNITED STATES PATENTS

| | | |
|---|---|---|
| 1,895,344 | Pink | Jan. 24, 1933 |
| 2,091,214 | Pink | Aug. 24, 1937 |
| 2,659,476 | Koerber | Nov. 17, 1953 |